A. CHRISTIANSON.
BRAKE HANGER.
APPLICATION FILED MAY 29, 1911.
998,870.
Patented July 25, 1911.
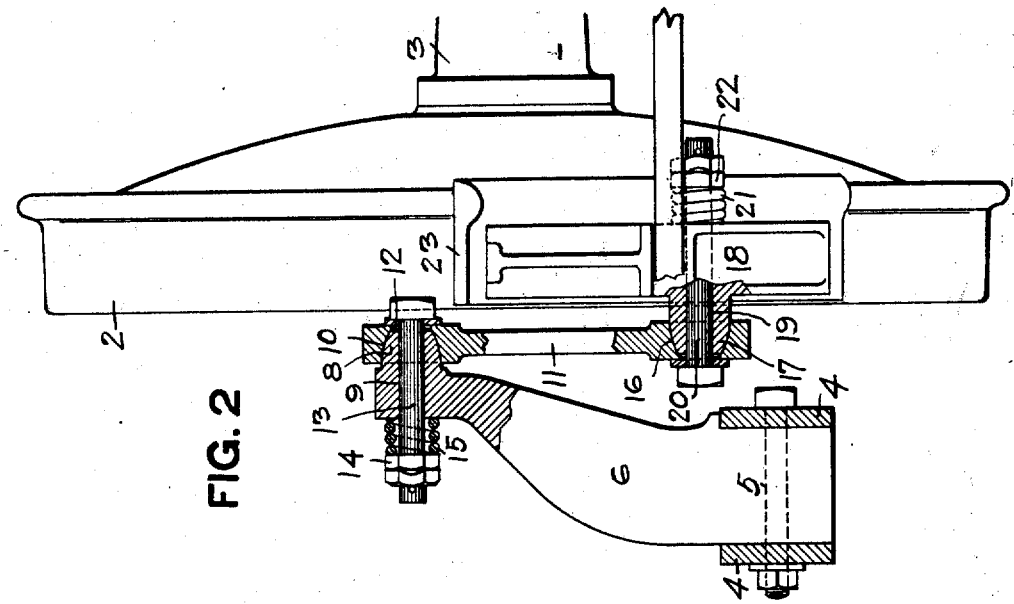
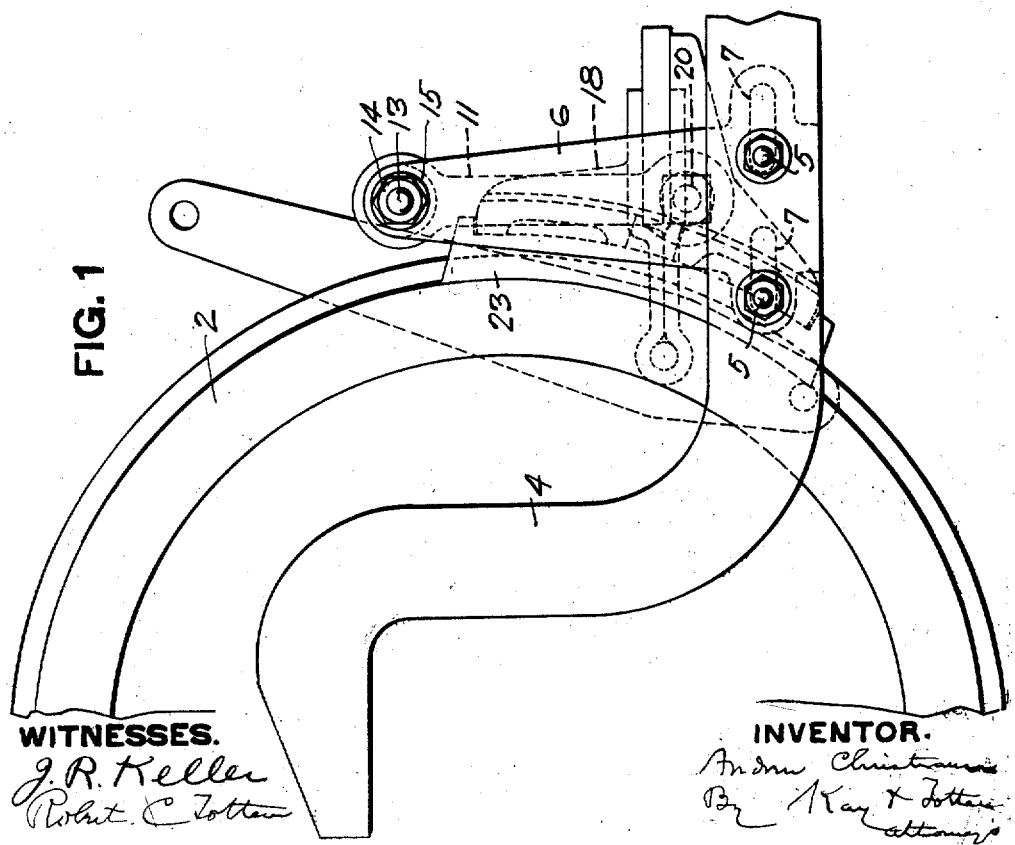
WITNESSES.
J. R. Keller
Robert C. Totten
INVENTOR.
Andrew Christianson
By Kay & Totten
Attorneys

UNITED STATES PATENT OFFICE.

ANDREW CHRISTIANSON, OF BUTLER, PENNSYLVANIA, ASSIGNOR TO STANDARD MOTOR TRUCK CO., OF PITTSBURG, PENNSYLVANIA, A CORPORATION OF PENNSYLVANIA.

BRAKE-HANGER.

998,870.
Specification of Letters Patent.
Patented July 25, 1911.

Application filed May 29, 1911. Serial No. 630,210.

*To all whom it may concern:*

Be it known that I, ANDREW CHRISTIANSON, a citizen of the United States, and resident of Butler, in the county of Butler and State of Pennsylvania, have invented a new and useful Improvement in Brake-Hangers; and I do hereby declare the following to be a full, clear, and exact description thereof.

My invention relates to brake hangers.

The object of my invention is to provide a simple form of brake hanger in which the brake shoe is suspended in such a way as to be held in proper position with the wheel so as not to sag or tilt and result in the uneven wear of the shoe.

To these ends my invention comprises, generally stated, a bracket carried by the equalizer bar, a single hanger having an opening at its upper end and a recess adapted to receive a tapering projection on said bracket, a bolt passing through said hanger and bracket and a spring interposed between a nut on said bolt and hanger, said hanger being provided with a like opening and recess at its lower end, and a brake shoe head having a conical projection engaging said recess and a bolt passing through said head and hanger, together with a spring interposed between a nut on said bolt and said brake shoe head.

In the accompanying drawings Figure 1 is a side elevation of my improved hanger; and Fig. 2 is an end view partly in section.

In the drawings the numeral 2 designates a portion of a car wheel mounted on the axle 3. The journal box and other parts I have deemed it unnecessary to illustrate, but have indicated the ordinary equalizer bar 4 which extends from one journal box to the other. Secured to the equalizer bar by means of the bolts 5 is the bracket 6. The bracket is provided at its lower end with the slots 7 for the adjustment of the bracket on the equalizer bar. At the upper end of the bracket is the projection 8 which is in the form of a truncated cone and an opening 9 is formed in said bracket and cone. The conical projection 8 fits within a correspondingly shaped recess 10 in the hanger 11. A space 12 is left for wear, as fully hereinafter set forth. A bolt 13 passes through the hanger and the bracket, said bolt being provided with the nut 14. A spring 15 is interposed between the nut 14 and the bracket so as to hold the hanger in tight engagement with the conical projection 8 of the bracket, and consequently the spring 15 is compressed sufficiently to give this result. The lower end of the hanger 11 is provided with a recess 16 to receive a like conical projection 17 on the brake shoe head 18. An opening 19 passes through the brake shoe head and a bolt 20 connects the hanger 11 with the brake shoe head. A spring 21 is interposed between a nut 22 on the bolt 20 and the brake shoe head. This spring is likewise compressed like the spring 15 above referred to, and creates sufficient friction to hold the brake shoe 23 up in proper position with reference to the tread of the wheel.

When my improved brake hanger is in use the springs 15 and 21 will act to take up all wear in the hanger and at the same time will create sufficient friction between the hanger and the bracket and the hanger and the brake shoe so as to insure the shoe being held up properly with reference to the wheel to prevent its tilting or sagging so as to wear unevenly. The springs will act to hold the brake shoe up very close to the tread of the wheel so that but very little movement of the brake shoe is required in braking or releasing.

What I claim is:

In a brake hanger, the combination of a bracket or support having a rounded tapering projection and an opening extending through said bracket and projection, a single hanger having a recess to receive said projection, a bolt passing through said hanger and bracket, a spring interposed between said bracket and an abutment on said bolt, a brake shoe head having a like projection entering a like seat in the lower end of said hanger, a bolt passing through said hanger and brake head and a spring interposed between said brake head and an abutment on said bolt.

In testimony whereof, I, the said ANDREW CHRISTIANSON, have hereunto set my hand.

ANDREW CHRISTIANSON.

Witnesses:
ROBERT C. TOTTEN,
JOHN F. WILL.